(12) United States Patent
Yoshizawa

(10) Patent No.: US 6,308,543 B1
(45) Date of Patent: Oct. 30, 2001

(54) KEY PLATE AND METHOD FOR MANUFACTURING THE SAME

(75) Inventor: Yuichi Yoshizawa, Tokyo (JP)

(73) Assignee: Alpha Corporation, Yokohama (JP)

(*) Notice: Subject to any disclaimer, the term of this patent is extended or adjusted under 35 U.S.C. 154(b) by 0 days.

(21) Appl. No.: 09/424,838

(22) PCT Filed: Jun. 16, 1998

(86) PCT No.: PCT/JP98/02650

§ 371 Date: Dec. 3, 1999

§ 102(e) Date: Dec. 3, 1999

(87) PCT Pub. No.: WO98/59137

PCT Pub. Date: Dec. 30, 1998

(30) Foreign Application Priority Data

Jun. 20, 1997 (JP) ................................................. 9-163921

(51) Int. Cl.[7] .............................. E05B 19/02; E05B 29/10
(52) U.S. Cl. ................................ 70/492; 70/406; 70/409; 76/110
(58) Field of Search ......................... 70/402, 405–407, 70/409, 492, 420, 493–496; 76/110

(56) References Cited

U.S. PATENT DOCUMENTS

| | | | | |
|---|---|---|---|---|
| 525,250 | * | 8/1894 | Bergevin | 70/403 |
| 1,804,955 | * | 5/1931 | Schlumpf | 70/401 |
| 3,264,352 | | 8/1966 | Gysin . | |
| 3,418,833 | * | 12/1968 | Kerr | 70/421 |
| 4,490,998 | * | 1/1985 | Wellekens | 70/419 |
| 5,823,030 | * | 10/1998 | Theriault et al. | 70/419 |

FOREIGN PATENT DOCUMENTS

| | | | | |
|---|---|---|---|---|
| 340267 | * | 9/1921 | (DE) | 70/492 |
| 388910 | * | 1/1924 | (DE) | 70/492 |
| 1428526 | * | 11/1968 | (DE) | 70/409 |
| 295 03 395 U | | 5/1995 | (DE) . | |
| 2 589 925 | | 5/1987 | (FR) . | |
| 2 266 918 A | | 11/1993 | (GB) . | |
| 46-3760 | * | 1/1971 | (JP) . | |
| 07-71145 | * | 3/1995 | (JP) . | |
| 1294956 | * | 3/1987 | (SU) | 70/406 |

* cited by examiner

Primary Examiner—Lloyd A. Gall
(74) Attorney, Agent, or Firm—Arent Fox Kintner Plotkin & Kahn

(57) ABSTRACT

A key plate includes a key plate body that extends longitudinally and has a grip portion and a keyhole insertion portion connected to the grip portion. The keyhole insertion portion includes a flat surface with a generally U-shaped groove formed into the flat surface. The generally U-shaped groove has a longitudinally-extending first cord groove, a longitudinally-extending second cord groove and a transversely-extending connecting groove that is disposed adjacent the grip portion and interconnects the first cord groove and the second cord groove. A method for manufacturing the key plate is also described.

8 Claims, 5 Drawing Sheets

KEY PLATE AND METHOD FOR MANUFACTURING THE SAME

TECHNICAL FIELD

The present invention relates to a key plate with two streaks of cord grooves which, when the key plate is inserted into a keyhole of a cylinder lock, presses against tumblers at their securing positions into their securing removal positions.

BACKGROUND ART

A cylinder lock includes a cylindrical-shaped cylinder case, a plug which has a keyhole opened at the front surface thereof and can be rotatably inserted into the inner peripheral surface of the cylinder case, and a plurality of tumblers which are disposed in such a manner as to be able to appear from and disappear into the outer peripheral surface of the plug and also which are energized in a direction where they can be engaged with the inner peripheral surface of the cylinder case to thereby prevent the rotation of the plug.

In a key plate which locks and unlocks the cylinder lock, there are provided cord grooves which, when the key plate is inserted into the keyhole completely, are able to match the respective tumblers to the outer peripheral surface (shear line) of the plug.

Now, FIG. 11 is a view explaining the relation between tumblers T, T' stored into the plug of the cylinder lock and a key plate K which, when it is inserted into the keyhole, presses against the tumblers T, T'.

There are provided a plurality of tumbler insertion holes along the longitudinal direction of the plug; and, into the respective tumbler insertion hole, there are inserted a tumbler T shown by a solid line and a tumbler T' shown by a chained line, opposite to the tumbler T in the vertical direction.

In the outer surfaces of the tumblers T and T' on the right side thereof, there is provided a cutaway recess 1, while a spring 2 is inserted into the cutaway recess 1.

A leading end portion 3 of the tumbler T projects upwardly from the outer peripheral surface of the plug and is engaged with the inner peripheral surface of the cylinder case, whereas a leading end portion 3' of the tumbler T' projects downwardly from the outer peripheral surface of the plug and is engaged with the inner peripheral surface of the cylinder case, to thereby preventing rotation of the plug.

In the respective interior portions of the tumblers T and T', there are formed key insertion holes 4 and 4' which respectively communicate with the keyhole of the plug; and, on the respective right inner wall surfaces of the key insertion holes 4 and 4', there are projectingly provided cord projections 5 and 5' respectively having heights corresponding to cords.

In the key plate K, there are formed two cord grooves: that is, a cord groove 6 which, when the key plate K is inserted into the keyhole completely, presses against the cord projection 5 downwardly to thereby match the leading end portion 3 of the tumbler T to the outer peripheral surface (shear line) of the plug; and, a cord groove 7 which, when the key plate K is inserted into the keyhole of the plug completely, presses against the cord projection 5' upwardly to thereby match the leading end portion 3' of the tumbler T' to the shear line of the plug.

Now, FIG. 12 is a front view of the key plate K, and there are provided the cord grooves 6 and 7 on the flat surface of a keyhole insertion portion 9 provided in such a manner as to extend from a leading end portion of a grip portion 8.

The cord groove 6 is used to push a plurality of the tumblers T including cord projections 5 having different heights down to their respective engagement removal positions, whereas the cord groove 7 is used to push a plurality of the tumblers T' including cord projections 5' having different heights up to their respective engagement removal positions. The cord grooves 6 and 7 are respectively formed in special shapes, and the positions of the cord grooves 6 and 7 that correspond to the cord projections 5 and 5' are requested with high positional precision because the tumblers T and T' must be matched to the shear line of the plug.

Accordingly, in cutting work of the cord grooves 6 and 7, there is used a profile milling machine (see Japanese Patent Unexamined Publication No. 4-19007 of Heisei) or an NC milling machine.

To work the cord grooves 6 and 7, the key plate K is clamped to a mounting member which is fastened and fixed onto a table of a milling machine, and while rotating a milling cutter of an end mill type positioned in front of the keyhole insertion portion 9, the table is fed to thereby start the cutting work from the front end of the keyhole insertion portion 9. When the milling cutter completes the cutting work to the rear end portion of one cord groove, the milling cutter is passed through the side surface of the keyhole insertion portion 9, to thereby escape outwardly thereof, and the table is then fed in a direction where the milling cutter can be returned to a position in front of the keyhole insertion portion 9. Next, the other cord groove 7 is worked similarly to the above-mentioned procedure.

However, in the above-mentioned key plate including the cord grooves, there are left problems to be solved which are as follows:

(1) When the cord groove is worked in one operation by an end mill having a diameter substantially equal to the width of the cord groove, the dimensional precision of the groove is generally liable to lower.

On the other hand, when the cord groove is worked in two operations by an end mill having a diameter smaller than the width of the cord groove, the dimensional precision and required surface roughness of the groove are liable to be secured. However, the time necessary to work the cord groove is doubled, to thereby result in the poor working efficiency.

(2) Even if the cord grooves are working in one operation, when the above working method of the cord grooves is analyzed, there are five required steps: (a) positioning the original point of the table with respect to the milling cutter; (b) working one cord groove while feeding the table; (c) feeding the table so as to escape the milling cutter and return it back to the position before working; (d) similarly to the step (b), working the other cord groove; and, (e) feeding the table so as to escape the milling cutter and return it back to the position before working.

Among the five steps, the steps (c) and (e) are wasteful steps which have no relation to the working of the cord grooves directly.

(3) In order to enhance the burglarproof effect, there is a case in which, separately from the tumblers, a dog plate is engaged with the cylinder case. However, if the dog plate is provided additionally, it is necessary to work a dog plate storage groove additionally on the flat surface of the key plate.

The present invention aims at solving the above problems, and it is an object of the invention to provide a key plate which not only can shorten the time necessary to work cord grooves and enhance the working precision of the cord grooves but also, when it is applied to a cylinder lock including a dog plate, can save the labor and time to work a dog plate storage groove.

DISCLOSURE OF THE INVENTION

In attaining the above object, according to a key plate of the invention, there is provided a key plate which comprises: a grip portion and a keyhole insertion portion provided in such a manner as to extend from the leading end portion of the grip portion, while the keyhole insertion portion includes two streaks of cord grooves respectively formed in the flat surface thereof, and also the key plate is structured such that, when the keyhole insertion portion is inserted into a keyhole of a cylinder lock, the cord grooves respectively press against a plurality of tumblers provided within the cylinder lock into their respective engagement removal positions to thereby allow the cylinder lock to be locked and unlocked, characterized by providing with a connecting groove connecting together the respective rear end portions (in more particular, the rear end portions in the insertion direction of the key plate) of the two streaks of cord grooves.

And, the above-mentioned cylinder lock is provided with an engagement groove in the inner peripheral surface of a cylinder case thereof and a dog plate provided in a plug to be inserted into the inner peripheral surface of the cylinder case, while the dog plate is capable of appearing from and disappearing into the outer peripheral surface of the plug in such a manner that, when one end thereof is pushed out into the inner peripheral surface of the cylinder case from the engagement groove, the other end thereof is projected into the keyhole. Also, the position of the connecting groove of the key plate may be set at a position where, when the key plate is completely inserted into the keyhole, the other end of the dog plate can be stored.

A method for manufacturing the above key plate is characterized by comprising the steps of: clamping the key plate on a mounting member fixed onto a table of a milling machine, rotating a milling cutter, moving the table to thereby start the milling of the key plate from the leading end side thereof, working the flat surface of the key plate with a given cutting depth to thereby form one of the cord grooves, cutting continuously from the rear end portion of the thus formed one cord groove to thereby form a connecting groove; and further, cutting continuously from the rear end portion of the other cord groove toward the leading end portion thereof, whereby the above-mentioned two streaks of cord grooves and connecting groove can be worked continuously.

In the above-mentioned method for manufacturing a key plate, the feeding direction of the table with respect to the rotation of the milling cutter, in an area where the reference surfaces (tumbler pressing surfaces) of the cord grooves are worked, may be set in a direction in which the rotation direction of the blades of the milling cutter is opposite to the feeding direction of the table, that is, a so called "upward milling operation".

BEST MODE FOR CARRYING OUT THE INVENTION

Figure 1:
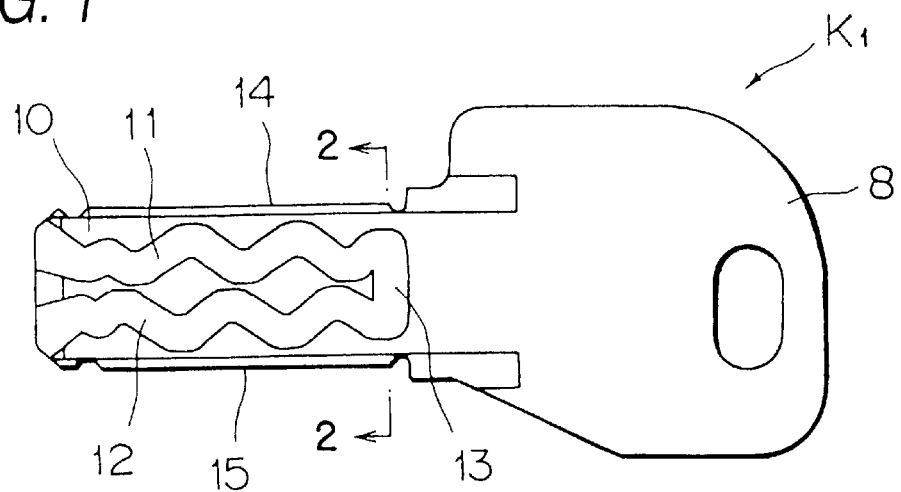
FIG. 1 is a front view of a key plate according to the invention.

Now, description will be given below of the embodiment of the invention with reference to the accompanying drawings. In a key plate $K_1$ according to the invention, as shown in FIG. 1 which is a front view thereof, in one flat surface of a keyhole insertion portion 10 which is formed in such a manner as to extend from the leading end of a grip portion 8 of the key plate $K_1$, there are formed two cord grooves 11 and 12 which are respectively opened in the leading end of the keyhole insertion portion 10. In addition, there is formed a connecting groove 13 connecting the rear end portions of the cord grooves 11 and 12.

Figure 6:
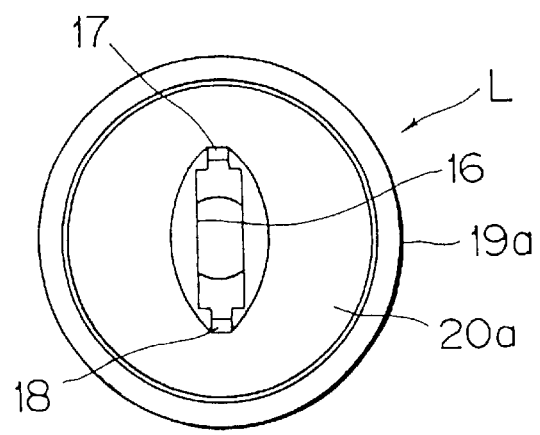
FIG. 6 is a front view of a cylinder lock.

By the way, two projecting portions 14 and 15, which are respectively provided on the upper and lower end faces of the keyhole insertion portion 10, are respectively to be inserted into grooves 17 and 18 (see FIG. 6) which are formed in the upper and lower ends of a keyhole 16 of a cylinder lock L.

Figure 2:
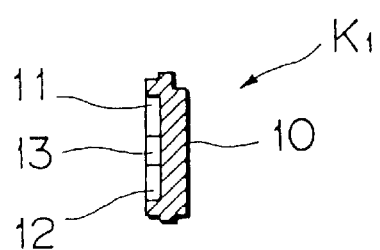
FIG. 2 is a section view taken along the line 2—2 shown in FIG. 1.

According to the present embodiment, the other flat surface of the keyhole insertion portion 10 is formed as a plane in which neither a projection nor a groove is formed (see FIG. 2 which is a section view taken along the line W—W shown in FIG. 1). However, alternatively, a projecting portion extending in parallel to the key-insertion direction may be provided on the other flat surface, and a guide groove capable of receiving the projecting portion may be formed in the side surface of the keyhole 16, so that any other key plate having a different projecting portion from the projecting portion of a regular key cannot be inserted into the guide groove.

The cylinder lock L, which can be locked and unlocked by the key plate $K_1$, is structured as follows: that is, a cylindrical-shaped cylinder case 19 of the key plate $K_1$ is formed with a large diameter inner peripheral surface 19a in the front end portion (in FIG. 3, in the right end portion) of the inner peripheral surface thereof; in the front end portion of a plug 20 which can be rotatably inserted into the cylinder case 19, there is formed a flange portion 20a which can be inserted into the large diameter inner peripheral surface 19a; the keyhole 16 is open in the front surface of the flange portion 20a (see FIGS. 3 and 6); in the rear end portion of the plug 20, there is provided an angular shaft portion 21 which projects backwardly of the cylinder case 19; and, on the angular shaft portion 21, there is mounted a tongue (not shown) which can be engaged with and removed from a lockmember provided in a door or the like.

Figure 3:
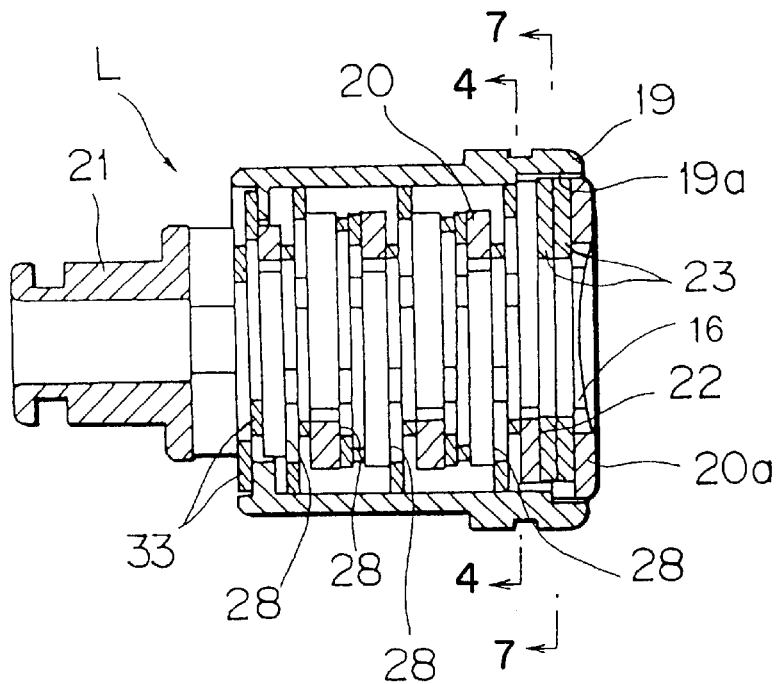
FIG. 3 is a longitudinal section view of a cylinder lock to which a key plate according to the invention is applied.
Figure 7:
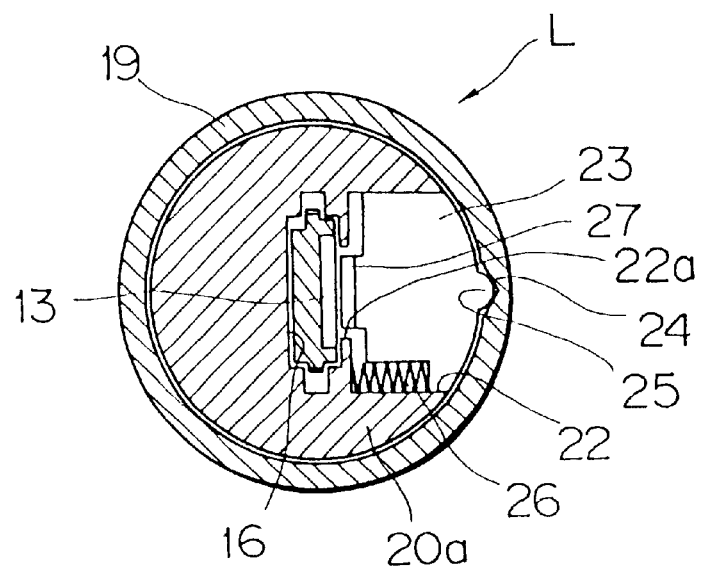
FIG. 7 is a section view taken along the line 7—7 shown in FIG. 3, showing a state that a key plate is inserted.

As shown in FIG. 7 which is a section view taken along the line 7—7 shown in FIG. 3, on the outer peripheral surface of the flange portion 20a, there is opened up a bottomed dog insertion hole 22 which is formed in such a manner that the section thereof has a flat and rectangular shape; and, in the bottom wall of the dog insertion hole 22, there is formed a small hole 22a which communicates with the keyhole 16.

In the leading end portion of a dog plate 23 which can be inserted into the dog insertion hole 22, there is provided a projection 25 which can be engaged with and removed from a recessed portion 24 formed in the inner peripheral surface of the cylinder case 19. The projection 25 is energized in a direction where it can be engaged with the recessed portion 24 by a spring 26 to be inserted between the dog plate 23 and the bottom wall of the dog insertion hole 22.

In the rear end portion of the dog plate 23, there is provided a projection 27 which can be projected into and retreated from the keyhole 16 through the small hole 22a. The projection 27 is arranged in such a manner as to project into the keyhole 16 when the projection 25 provided in the leading end portion of the dog plate 23 is pushed into the inner peripheral surface of the cylinder case 19 from the recessed portion 24.

Figure 4:
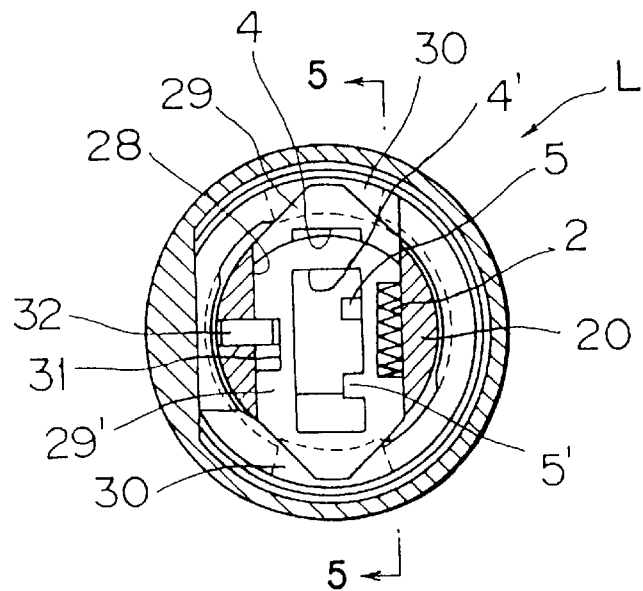
FIG. 4 is a section view taken along the line 4—4 shown in FIG. 3.

In the rear of the flange portion 20a, there are formed a plurality of tumbler insertion holes 28 (in the present embodiment, five tumbler insertion holes) which respectively extend through the outer peripheral surface of the plug 20 and are arranged in the longitudinal direction of the plug 20 (see FIGS. 3 and 4). Into the respective tumbler insertion hole 28, there can be inserted tumblers 29, 29' which are similar in structure to the previously described conventional tumblers T, T'.

Figure 5:
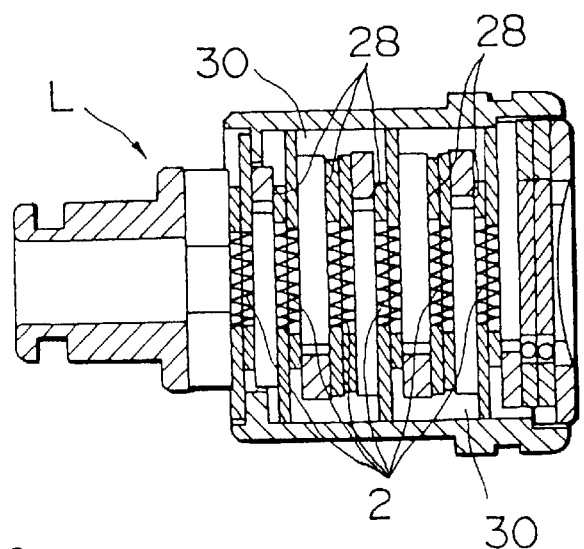
FIG. 5 is a section view taken along the line 5—5 shown in FIG. 4.

The tumblers 29, 29' are energized in their mutually opposing directions by a plurality of springs 2 which are similar in structure to the conventional springs. The leading end portions of the tumblers 29, 29' can be engaged with engaging recessed portions 30 which are respectively formed in the cylinder case 19 (see FIGS. 4 and 5).

As shown in FIG. 4, there is formed a recessed portion 31 on the left of the tumblers 29, 29'. In the plug 20, there is provided a stop plate 32 which can be engaged into the recessed portion 31 to thereby regulate the projecting amounts of the tumblers 29, 29'.

In the tumblers 29, 29', similarly to the conventional tumblers, there are formed key insertion holes 4, 4' respectively communicating with the keyhole 16 and, in the key insertion holes 4, 4', there are provided cord projections 5, 5' respectively.

Reference character 33 shown in FIG. 3 designates stop tumblers which are used to prevent the plug 20 from moving in the axial direction thereof but, because the stop tumblers 33 have no relation to the present invention, the description thereof is omitted herein.

Figure 8:
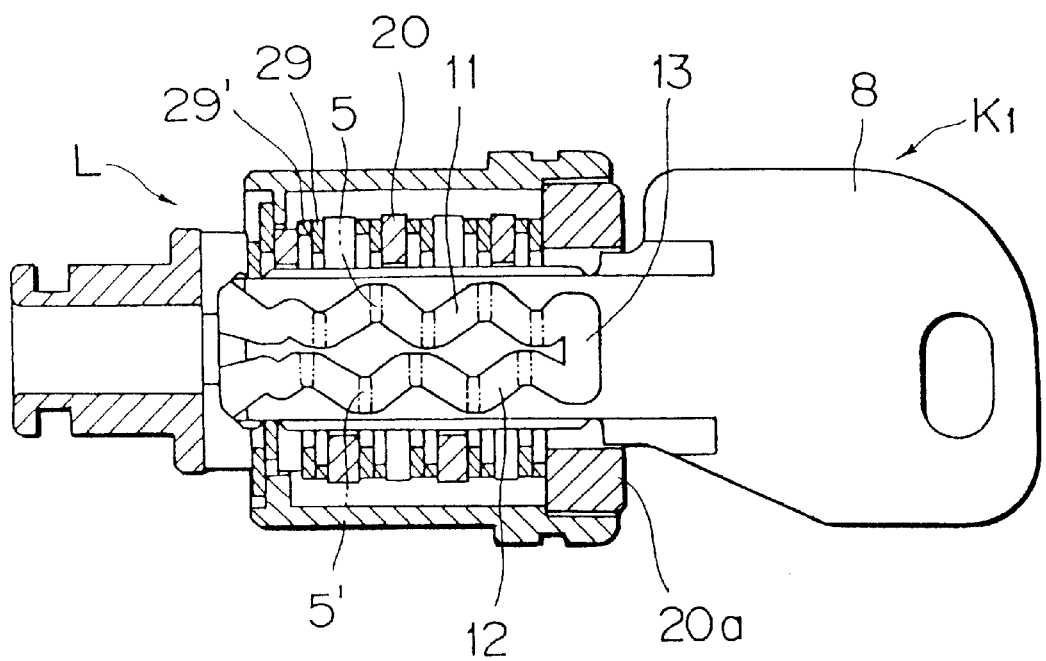
FIG. 8 is a longitudinal section view of a cylinder lock when a key plate is inserted.

As shown in FIG. 8, if the key plate $K_1$ is completely inserted into the keyhole 16 of the above-structured cylinder lock L, then the cord grooves 11 and 12 of the key plate $K_1$ are pressed against the cord projections 5, 5' to thereby merge the leading end portions of the tumblers 29, 29' into the outer peripheral surface of the plug 20, which allows the plug 20 to rotate.

A connecting groove 13 formed in the key plate $K_1$ lies at a position which faces the projection 27 of the dog plate 23.

If the key plate $K_1$ is operated or rotated in the unlocking direction, then the projection 25 in the leading end portion of the dog plate 23 is pushed from the recessed portion 24 onto the inner peripheral surface of the cylinder case 19, so that the projection 27 on the rear end side of the dog plate 23 is inserted into the connecting groove 13 of the key plate $K_1$.

That is, only the regular key plate $K_1$, in which the connecting groove 13 lies at the position facing the projection 27, can be rotationally operated, thereby being able to lock and unlock the cylinder lock L.

Figure 9:
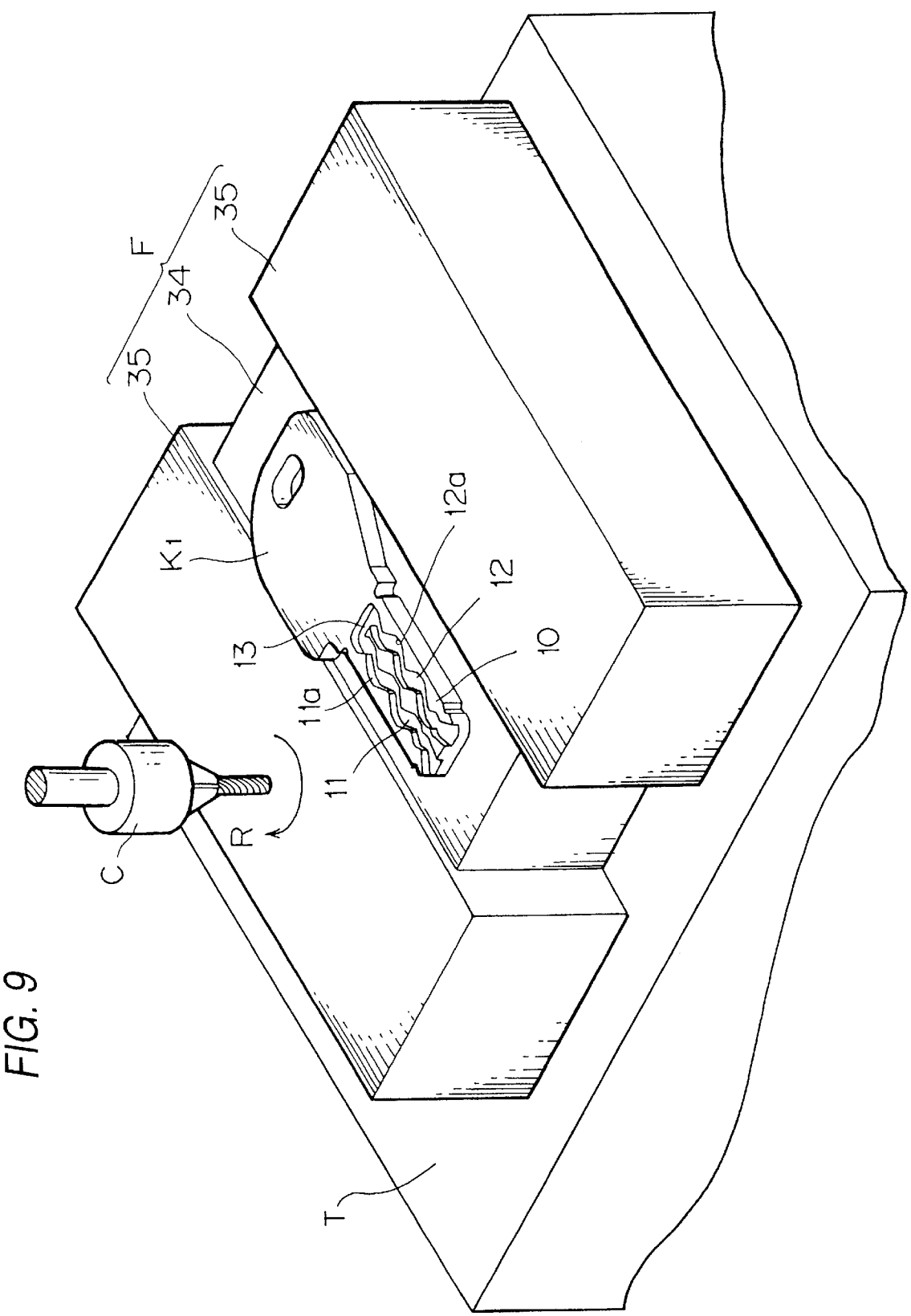
FIG. 9 is a perspective view explaining how to work a key plate.

Now, FIG. 9 is a perspective view explaining a method for manufacturing the key plate $K_1$, in which a mounting member F is fastened and fixed onto the table of an NC (numerically controlled)(or a profile) milling machine.

The mounding member F includes a carrier base 34 and two vises 35. The carrier base 34 includes a carrier surface on which the key plate $K_1$ is to be carried, and a reference member (not shown) which is used to position the key plate $K_1$. The key plate $K_1$ positioned on the carrier base 34 is clamped by the vises 35.

Of the cord grooves 11 and 12 of the key plate $K_1$, the portions that require position precision are only pressing surfaces 11a and 12a which are used to press against the cord projections 5 and 5'.

The pressing surfaces 11a and 12a, in FIG. 9, provide the outside inner wall surfaces of the cord grooves 11 and 12, whereas the opposite surfaces of the pressing surfaces 11a and 12a may have clearances with respect to the cord projections 5, 5' and thus do not require severe position precision.

Figure 10:
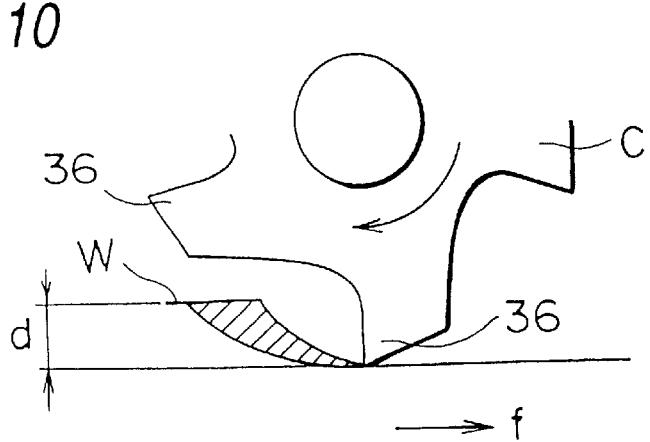
FIG. 10 is an explanatory view of a cutting operation to be executed by a milling cutter.
Figure 11:
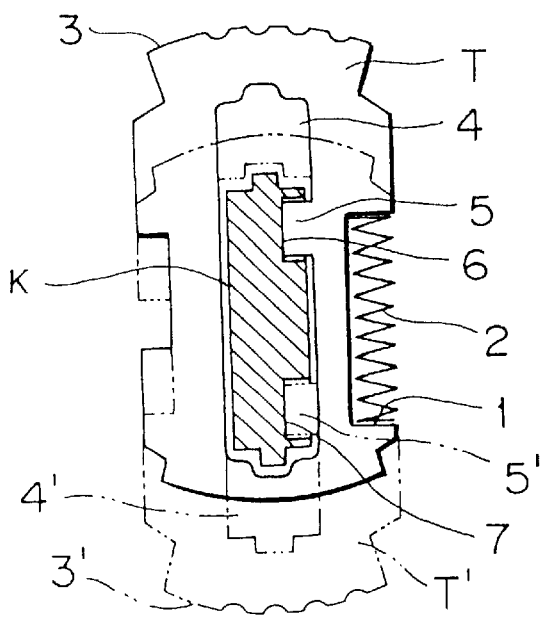
FIG. 11 is an explanatory view of the relation between tumblers and a key.
Figure 12:
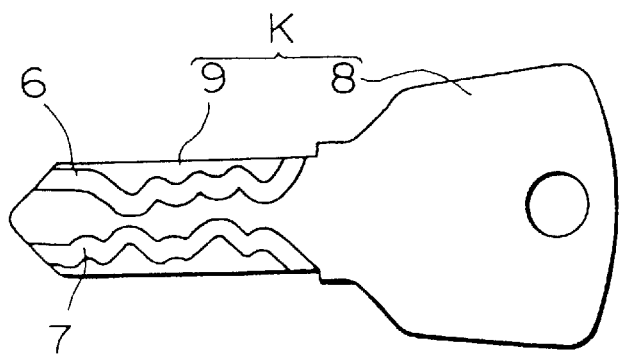
FIG. 12 is a front view of a conventional key plate including two streaks of cord grooves.

Now, FIG. 10 is an explanatory view in a state that the surface of a workpiece W is worked by a milling cutter C where an amount of cutting or milling is expressed as d and the feed direction of the table is expressed as f.

The milling operation includes two kinds of milling operations: that is, an "upward milling operation" (see FIG. 10) in which, as shown in FIGS. 9 and 10, a table T is fed in the opposite direction to the rotation direction of the blades 36 of the milling cutter C on the cutting side thereof; and, a "downward milling operation" in which the table T is fed in the same direction as the rotation direction of the blades 36 of the milling cutter C on the cutting side thereof.

In the "upward milling operation", the amount of cutting per blade is that shown by hatching in FIG. 10, that is, since the milling operation starts with a small milling amount, when the blade 36 bites at the workpiece, the blade 36 slips on the blade to thereby aggravate the wear of the cutting edge of the blade 36. On the other hand, in the "downward milling operation", since the milling operation starts with a large milling amount, the life of the milling cutter C is elongated.

However, in the "downward milling operation", the precision of the thus finished surfaces is lowered due to the influences of the cutting edges of the blades; but, in the "upward milling operation", the precision of the finished surfaces is good.

The above-mentioned conventional milling operation can be applied not only to an ordinary milling operation in which the surface of a workpiece is worked into a plane while the cutting amount d is specified, but also to a groove milling operation in which a workpiece is cut using an end mill to thereby form a groove.

That is, one of the side wall surfaces of the groove is worked according to the manner of the upward milling operation having a good finished surface precision and the other side wall surface thereof is worked according to the manner of downward milling operation. Thus, the moving or feeding direction of the table with respect to the rotation of the milling cutter C may be selected in such a manner that the pressing surfaces 11a and 12a of the cord grooves 11 and 12 can be cut according to the upward milling operation.

In particular, there is used a milling cutter C having a diameter substantially equal to the groove width of the cord grooves 11 and 12. The milling cutter C is lowered down to a position where the lower end surface of the milling cutter C (see FIG. 9) situated in front of the keyhole insertion portion 10 of the key plate $K_1$ coincides with the groove depth of the cord grooves 11 and 12, while this position is set as the original point or position of the milling cutter C. The table is moved in a direction where the pressing surface 11a of the cord groove 11 can be cut according to the upward milling operation, and thus the cord groove 11 is worked from the leading end portion of the keyhole insertion portion 10.

While being numerically controlled or profile controlled, the milling cutter C works the workpiece surface to thereby form the cord groove 11, then works the workpiece surface to thereby form the connecting groove 13 continuously from the rear end portion of the cord groove 11. Next, the milling cutter C shifts to the rear end portion of the cord groove 12 continuously from the connecting groove 13 and work the workpiece surface to thereby form the cord groove 12. After then, the milling cutter C moves to the front portion of the keyhole insertion portion 10, and, finally, returns to the original position.

According to the above operation, even in the working of the cord groove 12, the pressing surface 12a thereof is cut according to the upward milling operation and, for this reason, the two pressing surfaces 11a and 12a can be worked with high precision through a single milling operation by the milling cutter C.

Accordingly, this not only can minimize the time necessary to work the key plate $K_1$ but also can secure the desired working dimensional precision and finished surface precision.

In the conventional key plate, because the milling cutter is moved to escape outwardly of the key plate from the rear ends of the cord grooves 6 and 7, the key plate is easy to interfere with the vises which are used to clamp the key plate. Therefore, there is caused a problem that the clamping positions of the vises are limited. On the other hand, in the key plate $K_1$ according to the invention, since the milling cutter C is not moved to escape outwardly of the key plate $K_1$, there is no such limitation but the whole of the keyhole insertion portion 10 can be held and, therefore, the key plate $K_1$ can be clamped at a position where it can be held most effectively.

INDUSTRIAL APPLICABILITY

As is structured in the above-mentioned manner, the present invention can provide the following effects: that is, (1) since the two streaks of cord grooves can be worked at a time or in a single operation through the shortest course just like a picture drawn with a single stroke of the brush, the working time of the key plate is shortened and the cost of the key plate can be reduced;

(2) because the connecting groove can be worked at the same time when the two streaks of cord grooves are worked, the connecting groove can be used as a storage hole for storing the dog plate which is moved in the keyhole direction;

(3) as the pressing surfaces of the two cord grooves can be finished according to the upward milling operation without switching the rotation of the milling cutter, the two cord grooves can be worked with high precision not only in the dimensions thereof but also in the surface roughness thereof; and, (4) since there is no possibility that, when working the cord grooves of the key plate, the milling cutter can interfere with the clamping of the key plate, the key plate can be clamped at a position where it can be held most effectively.

What is claimed is:

1. A key plate and cylinder lock combination, comprising:
a key plate body extending longitudinally and having a grip portion and a keyhole insertion portion connected to the grip portion, the keyhole insertion portion including a flat surface with a generally U-shaped groove formed into the flat surface, the generally U-shaped groove having a longitudinally-extending first cord groove, a longitudinally-extending second cord groove and a transversely-extending connecting groove disposed adjacent the grip portion and interconnecting the first cord groove and the second cord groove; and
a cylinder lock formed with a keyhole sized for insertion of the keyhole insertion portion of the key plate body and including a plurality of tumblers movable between a mormally locked postion and an unlocked postion wherein
when the keyhole innsertion portion is inserted into the keyhole, the first and second cord groovver press against the pluralidty of tumblers moving the tumblers from the normally locked position to the unlocked position thereby allowing the cylinder lock to be locked and unlocked.

2. A key plate and cylinder lock combination as set forth in claim 1, wherein said cylinder lock includes a recessed portion formed in the inner peripheral surface of a cylinder case thereof, and a dog plate provided in a plug to be inserted into the inner peripheral surface of said cylinder case, said dog plate capable of appearing from and disappearing into the outer peripheral surface of said plug in such a manner that, when one end thereof is pushed out into the inner peripheral surface of said cylinder case, the other end thereof is projected into said keyhole, and also wherein the position of said connecting groove of said key plate is set at a position where, when said key plate is completely inserted into said keyhole, the other end of said dog plate can be stored.

3. A key plate for insertion into a keyhole formed in a cylinder lock containing a plurality of tumblers movable between a normally locked position and an unlocked position, the key plate comprising a grip portion and a keyhole insertion portion formed in such a manner as to extend from a leading end portion of said grip portion, said keyhole insertion portion including two streaks of cord grooves formed in a flat surface thereof, said key plate being structured such that, when said keyhole insertion portion of said key plate is inserted into the keyhole formed in the cylinder lock, said respective cord grooves respectively press against the plurality of tumblers moving the tumblers from the normally locked position to the unlocked position to thereby allow said cylinder lock to be locked and unlocked, wherein a connecting groove connects respective rear end portions of said two streaks of cord grooves.

4. A method for manufacturing a key plate, in which said key plate is clamped on a mounting member fixed onto a table of a milling machine, and said key plate is milled by a milling cutter starting on the leading end side thereof, said method comprising the steps of: milling a flat surface of said key plate with a given cutting depth to thereby form one of two cord grooves; then, milling said flat surface continuously from the rear end portion of said one groove to thereby form a connecting groove; and further, milling said flat surface continuously from said connecting groove to thereby form the rear end portion of the other groove and toward the leading end portion thereof, whereby two streaks of cord grooves and said connecting groove can be worked continuously.

5. A method for manufacturing a key plate as set forth in claim 4, wherein the feeding direction of said table with respect to the rotation of said milling cutter, in an area where reference surfaces of said two cord grooves are worked, is set in a direction in which a rotation direction of said milling cutter is opposite to said table feeding direction.

6. A key plate, comprising:
   a key plate body extending longitudinally and having a grip portion and a keyhole insertion portion connected to the grip portion, the keyhole insertion portion including a flat surface with a generally U-shaped groove formed into the flat surface, the generally U-shaped groove having a longitudinally-extending first cord groove, a longitudinally-extending second cord groove and a transversely-extending connecting groove disposed adjacent the grip portion and interconnecting the first cord groove and the second cord groove.

7. A key plate according to claim 6, wherein the generally U-shaped groove has a uniform depth.

8. A key plate according to claim 6, wherein the keyhole insertion portion has a distal end disposed opposite the grip portion, the distal end including a first opening and a second opening, the first opening in cross-section defining a first entrance into the first cord groove and the second opening in cross-section defining a second entrance into the second cord groove.

* * * * *